US009630541B2

(12) United States Patent
López Aguado Álvarez

(10) Patent No.: US 9,630,541 B2
(45) Date of Patent: Apr. 25, 2017

(54) VEHICLE PILLAR TRANSFER AID

(71) Applicant: FORD GLOBAL TECHNOLOGIES, LLC, Dearborn, MI (US)

(72) Inventor: Jorge Antonio López Aguado Álvarez, Mexico (MX)

(73) Assignee: Ford Global Technologies, LLC, Dearborn, MI (US)

(*) Notice: Subject to any disclaimer, the term of this patent is extended or adjusted under 35 U.S.C. 154(b) by 14 days.

(21) Appl. No.: 14/707,064

(22) Filed: May 8, 2015

(65) Prior Publication Data
US 2016/0325664 A1 Nov. 10, 2016

(51) Int. Cl.
B60N 99/00 (2006.01)
B60N 3/02 (2006.01)
B62D 25/04 (2006.01)
B60J 10/00 (2016.01)

(52) U.S. Cl.
CPC ............. *B60N 3/02* (2013.01); *B60J 10/00* (2013.01); *B62D 25/04* (2013.01)

(58) Field of Classification Search
CPC ............ B60N 3/02; B60J 10/00; B62D 25/04
See application file for complete search history.

(56) References Cited

U.S. PATENT DOCUMENTS

| 5,474,353 | A | 12/1995 | Koester et al. |
| 5,494,249 | A * | 2/1996 | Ozark ............ B60N 3/102 224/926 |
| 7,819,465 | B2 | 10/2010 | Elliott et al. |
| 7,922,189 | B1 | 4/2011 | Dillon et al. |
| 8,104,813 | B2 | 1/2012 | She |
| 8,636,313 | B2 | 1/2014 | Huelke et al. |
| 8,840,136 | B2 | 9/2014 | Masatsugu et al. |
| 2011/0291435 | A1 | 12/2011 | Matusko et al. |

FOREIGN PATENT DOCUMENTS

DE          101 52 457 A1 *   8/2003

* cited by examiner

*Primary Examiner* — Lori L Lyjak
(74) *Attorney, Agent, or Firm* — Jason Rogers; King & Schickli, PLLC

(57) ABSTRACT

A pillar for a vehicle includes a recess provided in a portion thereof for use as a transfer aid when exiting or entering the vehicle. The recess may be provided in a side wall of the pillar. A supplemental seal may be associated with a door of the vehicle, the seal being dimensioned to substantially occlude a gap defined between the recess and the door when placed in the closed configuration. Inclusion of the recess in different vehicle pillars such as the B pillar and C pillar is contemplated.

7 Claims, 5 Drawing Sheets

VEHICLE PILLAR TRANSFER AID

TECHNICAL FIELD

This disclosure relates generally to armrests for motor vehicles. More particularly, the disclosure relates to a supplemental armrest provided in a pillar of a motor vehicle, and to vehicle pillars including such armrests.

BACKGROUND

With reference to FIG. 1, as is known a motor vehicle 10 typically includes an engine compartment 12, a passenger compartment 14, and some type of cargo compartment 16 such as a trunk, rear hatch, etc. The passenger compartment 14 is defined by at least a floor 18, a roof 20, and passenger compartment doors 22 (in the depicted embodiment, the driver's-side door is removed for convenience) which when in a closed configuration as shown in FIG. 1 also provide side walls to the passenger compartment 14. A door seal (not shown) is typically provided, fabricated of a flexible material such as rubber or a polymer, which seals any gaps between the doors 22 and other components of the passenger compartment 14 to prevent intrusion of wind and moisture, and to assist in reducing the amount of exterior noise (engine noise, tire noise, etc.) entering the passenger compartment.

The motor vehicle 10 also includes one or more pillars (sometimes referred to as posts) which provide structural support to various portions of the passenger compartment 14. As is known, pillars are the vertical or quasi-vertical supports of a vehicle 10's window area or "greenhouse." These pillars are by convention identified by their placement beginning at a juncture of the engine compartment 12 and the passenger compartment 14, and then being numbered or lettered sequentially proceeding towards a rear of the vehicle 10. Thus, the pillars disposed at either side of the vehicle front windscreen 24 are the A pillars 26. The pillars extending between the passenger compartment roof 20 to the floor 18 are the B pillars 28. The pillars disposed at a rear of the vehicle rear door, in the depicted embodiment being disposed at either side of the vehicle rear window 30, are the C pillars 32. In longer vehicles such as station wagons, SUVs, limousines, etc. D pillars may be provided. Still more, vehicles with additional doors may be provided with more than one pair of B pillars, designated B1, B2, etc.

Difficulties can be encountered in the seemingly simple task of exiting such vehicles from a seated position on, e.g., seat 34. For example, in a crowded parking lot with narrow parking spaces where a door 22 cannot be fully opened without contacting an adjacent vehicle, a driver or passenger may have difficulty exiting the vehicle through the relatively narrower opening provided between the partially opened door 22 and the vehicle 10 body.

In turn, individuals may simply have difficulty exiting seat 34. As non-limiting examples, the elderly and individuals with physical impairments may have difficulty exiting a conventional vehicle seat 34. Alternatively, exiting a seat 34 that is held in a vehicle 10 that is built very low to the ground may be difficult for anyone. For this latter reason, a wide variety of ancillary handles and other transfer aids (transfer boards, transfer discs, swiveling discs or seat cushions, slides, and others) are in the marketplace, to provide a supplemental hand-hold for support/balance assistance to assist such individuals in exiting/entering a vehicle 10. Such ancillary handles/transfer aids, however, are easily misplaced or lost.

Thus, a need is identified in the art for structures to assist individuals in exiting the motor vehicle, such as in the exemplary non-limiting situations described above.

SUMMARY

In accordance with the purposes and benefits described herein and to solve the above-summarized and other problems, in one aspect a motor vehicle pillar including a transfer aid is described. The transfer aid is provided by a recess formed in a portion of the vehicle pillar, for use by a user to assist in entering and/or exiting the vehicle.

In other aspects of the disclosure, transfer aids according to the foregoing are provided. Still further, motor vehicles incorporating the above-described structures are described.

In the following description, there are shown and described embodiments of the disclosed motor vehicle pillar. As it should be realized, the pillar is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed motor vehicle pillar, and together with the description serve to explain certain principles thereof. In the drawing.

Reference will now be made in detail to embodiments of the disclosed motor vehicle pillar, examples of which are illustrated in the accompanying drawing figures wherein like reference numerals indicate like features.

DETAILED DESCRIPTION

Figure 1:
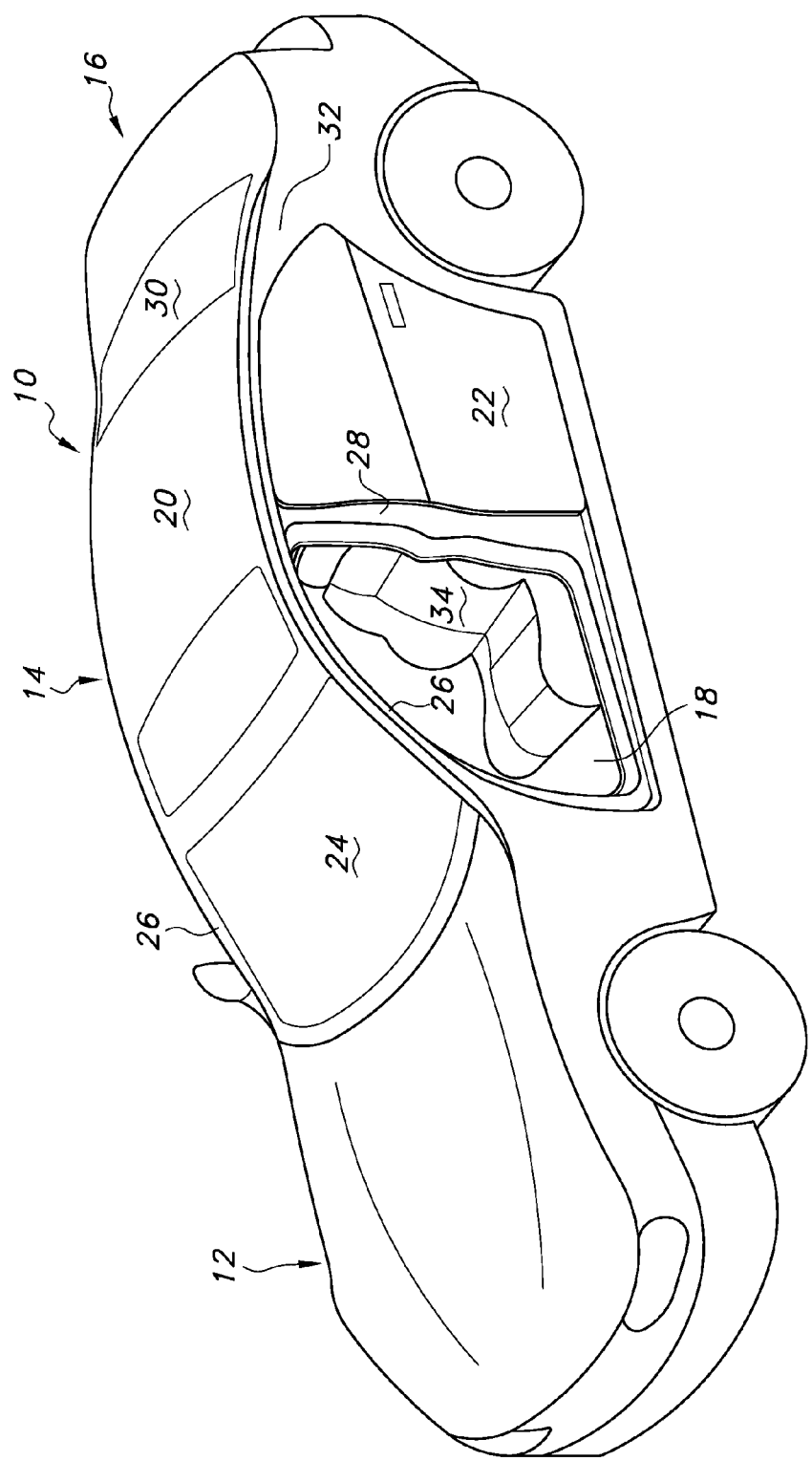
FIG. 1 depicts a prior art motor vehicle including a conventional B pillar.
Figure 2A:
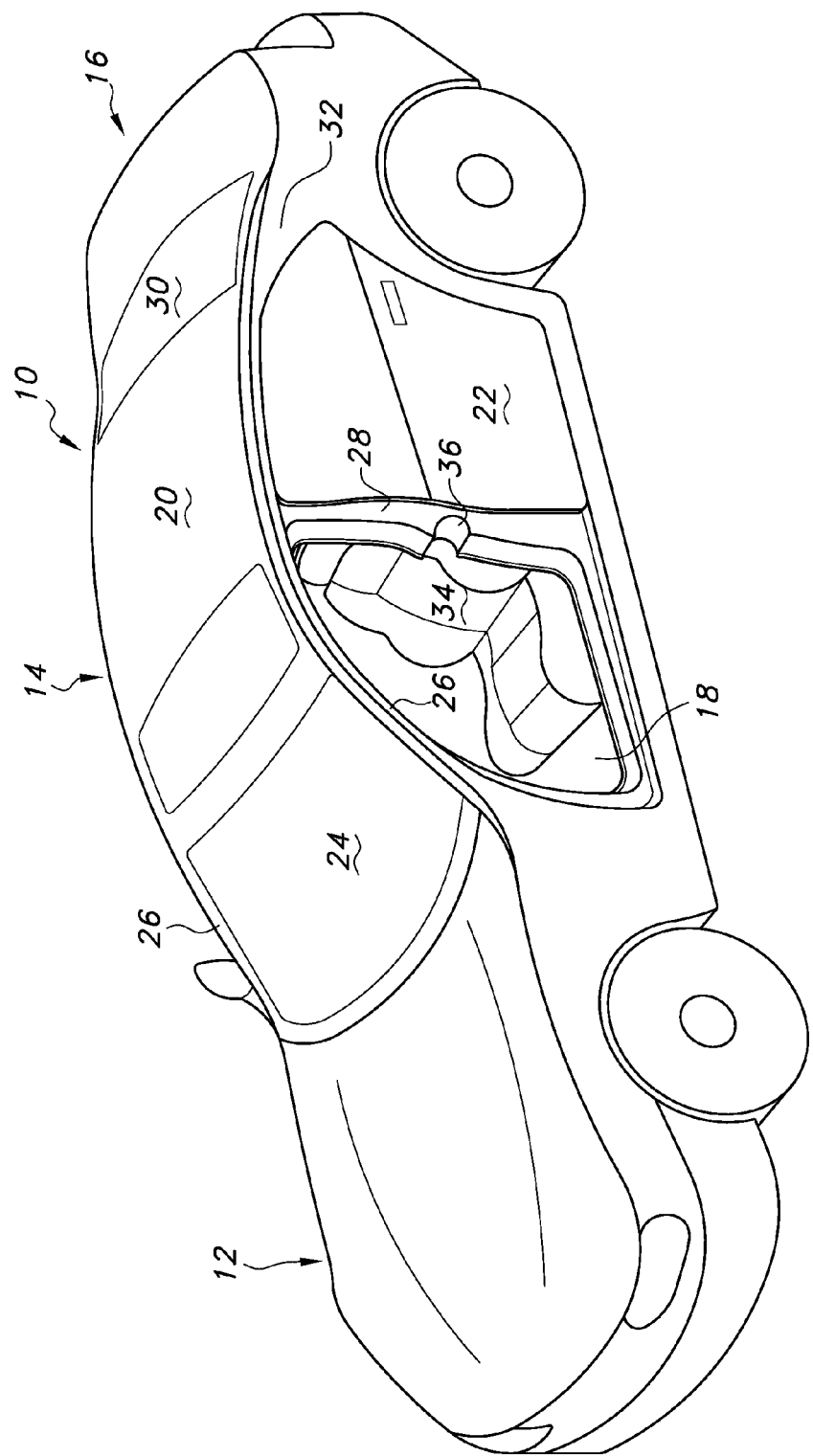
FIG. 2A depicts a motor vehicle including a B pillar including a transfer aid according to the present disclosure.

With reference to FIG. 2A, a motor vehicle 10' is depicted including a pillar according to the present disclosure, and including a recess 36 in a side wall thereof. The present disclosure describes the pillar primarily in the context of a B pillar 28 as shown therein. However, the skilled artisan on reading the descriptions and depictions presented herein will readily appreciate that the described recess 36 and associated functions and advantages are readily adaptable to any vehicle pillar disposed near a motor vehicle seat.

Figure 2B:
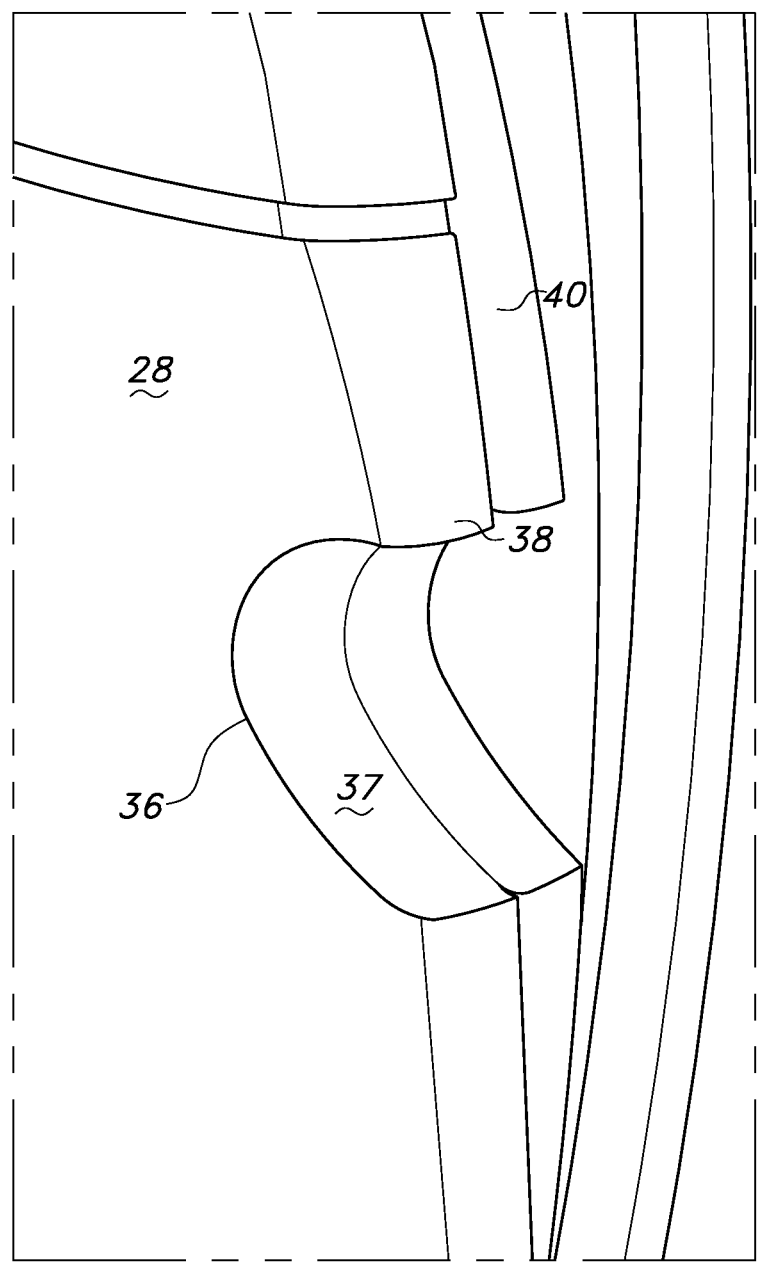
FIG. 2B shows an isolated view of a B pillar including a transfer aid according to the present disclosure.

As shown in FIG. 2B, in an embodiment the described transfer aid is provided by simply including a recess 36 in a side wall 38 of a vehicle pillar, in the depicted embodiment being the B pillar 28. As will be appreciated, that recess 36 may be provided by any suitable means, including without limitation stamping the desired shape of the recess 36 into the side wall 38 during fabrication of pillar 28, by cutting a recess 36 into a finished pillar 28, etc. As will also be appreciated, all or a portion of an interior surface 37 of recess 36 may be covered by an ornamental trim material (not shown), which in turn may be cushioned to further improve user comfort.

In the depicted embodiment, a portion of a seal 40 adjacent to recess 36 is removed, to prevent occlusion of recess 36. As will be described below, this removed portion of seal 40 may optionally be supplemented by a cooperating complementary portion of seal material disposed on door 22, to provide a complete seal against moisture, wind, and noise when door 22 is in a closed configuration.

Figure 3:
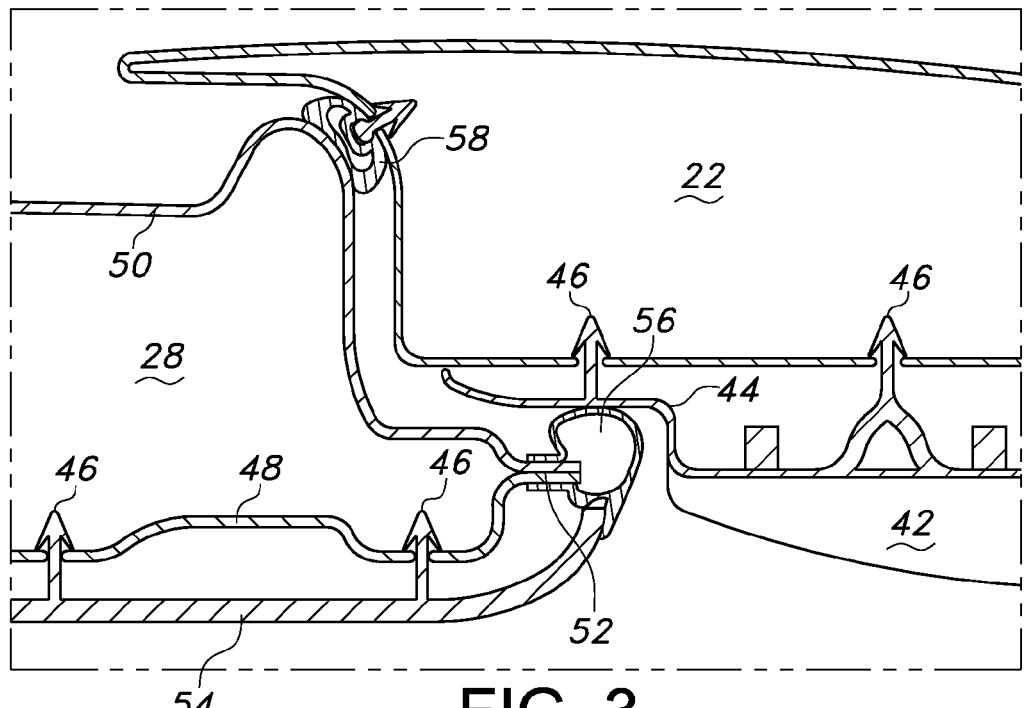
FIG. 3 depicts a top section cut view of a B pillar and vehicle door according to the present disclosure.

Turning to FIG. 3, a top section cut view of a B pillar 28 and vehicle door 22 is shown. In the depicted embodiment, door 22 includes an armrest 42 and a door inner trim piece 44, secured to the material of door 22 by one or more pushpin structures 46.

The B pillar 28 is in the depicted embodiment formed by two adjoining pieces of material 48, 50, adjoined at a junction 52 by, e.g., welding, fasteners, etc. A pillar trim piece 54 is secured to pillar 28, in the depicted embodiment by integral pushpins 46 (although alternative fasteners and/or adhesives are possible and contemplated). An inner seal 56 is attached to B pillar 28 and/or to pillar trim 54, such as at junction 52. An outer seal 58 is attached to a portion of door 22. In combination, inner and outer seals 56, 58 provide a seal between pillar 28 and door 22, reducing or preventing intrusion of air and moisture from an exterior of the vehicle 10', and also reducing exterior noise.

Figure 4:
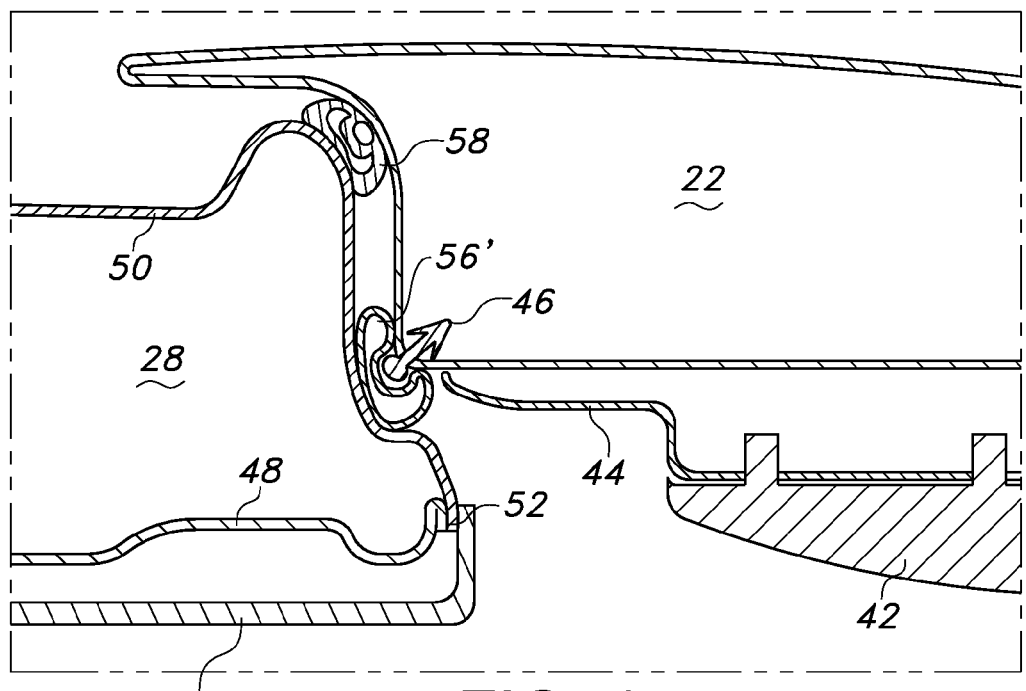
FIG. 4 depicts a top section cut view of a B pillar and vehicle door according to the present disclosure, showing a portion of the B pillar transitioning into a transfer aid provided in a side wall of the B pillar.

Transitioning down a length of B pillar 28, FIG. 4 depicts a transition zone between a top portion of B pillar 28 and a portion of B pillar 28 including a recess 36 as described herein. A portion of junction 52 has been removed due to the presence of recess 36, and the remaining portion may be covered by pillar trim 54 as shown to provide a smooth surface. Here, because of the removal of a portion of inner seal 56 to accommodate recess 36, a complementary inner seal 56' is disposed on door 22, thus occluding any gap that may be defined between recess 36 and door 22 when closed.

Figure 5:
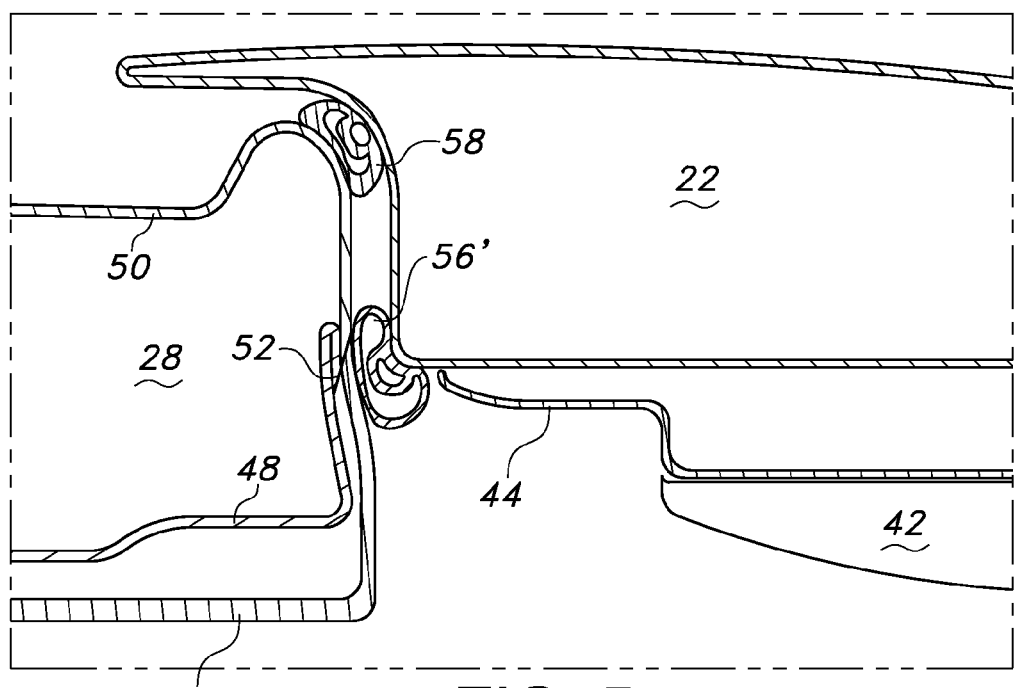
FIG. 5 depicts a top section cut view of a B pillar and vehicle door according to the present disclosure, showing a portion of the B pillar including a transfer aid provided in a side wall of the B pillar.

As shown in FIG. 5, further transitioning down the length of B pillar 28, in a central zone of recess 36 junction 52 is substantially eliminated, and further may be overlaid by pillar trim 54 and/or complementary inner seal 56' (which as discussed above is attached to door 22 rather than to the pillar 28), thus presenting a smooth surface for recess 36 to the user. Again, by positioning complementary inner seal 56' as described above, any gap that may be defined between recess 36 and door 22 when closed remains occluded.

As will be appreciated, in the above-described situations of a crowded parking lot with narrow parking spaces where a door 22 cannot be fully opened without contacting an adjacent vehicle or a physically impaired driver or passenger, recess 36 provides a convenient transfer aid that can be used in addition to or as an alternative for a conventional armrest structure (not shown) associated with the vehicle door 22 for use in assisting that individual in exiting the vehicle 10'. As the skilled artisan will readily appreciate, a user need only place, e.g., her arm, hand, forearm, etc. in recess 36, and that recess 36 provides a convenient support point for the user to employ in assisting herself in entering or exiting the vehicle. Thus, recess 36 functions as a vehicle-integrated transfer aid whereby the user need not purchase or carry a supplemental transfer aid for exiting/entering the vehicle.

Advantageously, the transfer aid provided by recess 36 is associated with the vehicle 10', and so cannot be lost or misplaced absent losing or misplacing the entire vehicle. In the depicted embodiment, a substantially concave recess 36 is shown for purposes of description. Conveniently, an ergonomic shape may be chosen for recess 36 for reasons of user convenience and comfort. However, the skilled artisan will readily appreciate that any suitable shape for recess 36 is contemplated, for example differently curved concavities, square, rectangular, etc.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A pillar for a vehicle, including a recess provided in a side wall thereof, the recess including an opening oriented in a motor vehicle-forward direction for use as a transfer aid when exiting or entering the vehicle.

2. The pillar of claim 1, wherein the pillar is selected from the group consisting of a B pillar and a C pillar.

3. The pillar of claim 1, further including a supplemental seal associated with a door of the vehicle, the supplemental seal being dimensioned to substantially occlude a gap defined between the recess and the door when placed in the closed configuration.

4. A vehicle including the pillar of claim 1.

5. A motor vehicle, comprising a passenger compartment defined by at least a floor, a ceiling, a plurality of pillars, and a plurality of passenger compartment doors;
   wherein at least one of the pillars includes a recess provided in a side wall thereof for use as a transfer aid for entering or exiting the vehicle;
   further including a supplemental seal associated with the passenger compartment door, the supplemental seal being dimensioned to substantially occlude a gap defined between the recess and the passenger compartment door when placed in the closed configuration.

6. The motor vehicle of claim 5, wherein the plurality of pillars includes at least a pair of B pillars.

7. The motor vehicle of claim 5, wherein the plurality of pillars further includes at least a pair of C pillars.

* * * * *